US007158987B2

(12) United States Patent
Endo et al.

(10) Patent No.: US 7,158,987 B2
(45) Date of Patent: Jan. 2, 2007

(54) DATA SEARCH SYSTEM AND DATA SEARCH METHOD

(75) Inventors: Susumu Endo, Kawasaki (JP); Yusuke Uehara, Kawasaki (JP); Daiki Masumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 200 days.

(21) Appl. No.: 09/994,769

(22) Filed: Nov. 28, 2001

(65) Prior Publication Data

US 2002/0169761 A1    Nov. 14, 2002

(30) Foreign Application Priority Data

May 14, 2001    (JP)    ............... 2001-143541

(51) Int. Cl.
*G06F 17/00*    (2006.01)
(52) U.S. Cl. ................. 707/102; 707/130 Y; 707/104.1
(58) Field of Classification Search .................... 707/3, 707/5, 6, 103 Y, 104.1
See application file for complete search history.

(56) References Cited

U.S. PATENT DOCUMENTS

| 5,802,361 | A | * | 9/1998 | Wang et al. ................. 382/217 |
| 5,883,978 | A | * | 3/1999 | Ono ........................... 382/248 |
| 5,905,579 | A | * | 5/1999 | Katayama et al. ........... 358/296 |
| 6,101,284 | A | * | 8/2000 | Matsubara et al. .......... 382/260 |
| 6,121,969 | A | * | 9/2000 | Jain et al. .................... 715/850 |
| 6,370,197 | B1 | * | 4/2002 | Clark et al. ............. 375/240.19 |
| 6,501,857 | B1 | * | 12/2002 | Gotsman et al. ............ 382/224 |
| 6,556,707 | B1 | * | 4/2003 | Yagishita et al. ........... 382/162 |
| 6,564,206 | B1 | * | 5/2003 | Ikeda ............................. 707/3 |
| 6,836,728 | B1 | * | 12/2004 | Shimabara .................. 701/212 |

FOREIGN PATENT DOCUMENTS

| JP | 2000-90112 | 3/2000 |
| WO | WO 00/45342 | 8/2000 |

OTHER PUBLICATIONS

Tian et al., "Combine User Defined Region-of-Interest and Spatial Layout for Image Retrieval", Jul. 2000, pp. 746-749, Int. Conf. Image Processing: Proceedings (vol. 3).
Freire et al., "Feature Extractor and Search Engine for Automatic Object Recognition", Nov. 1998, pp. 538-547, Int. Soc. Opt. Eng.: Proceedings (vol. 3572).
Park et al., "WISE: WWW Image Search Engine", 1998, pp. 305-313, Journal of KISS(C) Computing Practices (vol. 4).

* cited by examiner

*Primary Examiner*—Sana AL-Hashemi
(74) *Attorney, Agent, or Firm*—Staas & Halsey LLP

(57) ABSTRACT

A data retrieving part searches a database for data under the conditions for a search input by a user through a search condition input part. A classifying and arranging part classifies and arranges data (search results) using feature values. A ground information providing part provides each data with ground information visualizing the ground for classification and arrangement of the data. The ground information is, for example, visualized distribution information of feature values of the data, color histogram label information, and label information on wavelet conversion feature values. A display part displays each data together with corresponding ground information, in accordance with the information on classification and arrangement from the classifying and arranging part.

12 Claims, 13 Drawing Sheets

DATA SEARCH SYSTEM AND DATA SEARCH METHOD

BACKGROUND OF THE INVENTION

1. Field of the Invention

The present invention relates to a data search system and a data search method for flexibly and efficiently searching for intended data from a large amount of data.

2. Description of the Related Art

Conventionally, as a method for searching for intended data from a large amount of data, a method for conducting a search using text information describing data as a search key and a method for conducting a search using feature values in data as a search key are known.

The method using text information as a search key has the following problems. First, there is a problem regarding search accuracy. It is not easy to provide text information accurately representing data, so that text information provided to data is likely to be insufficient. In this case, it takes time and labor to search for intended data in search processing using text information specified by a user as a search key, which hinders enhancement of search accuracy. Second, it takes a long time for pre-processing. It is generally difficult to automatically provide each data with text information accurately representing the data; in most cases, it is required to manually confirm whether or not automatic provision of text information is appropriate, and it is also required to conduct an operation for manually adding text information, which results in a considerable time for pre-processing.

Therefore, the method for conducting a search using feature values in data as a search key has been paid attention to. In the conventional search processing using feature values as a search key, feature values used for a search are paid attention to, and feature values of each data are evaluated, whereby data having similar feature values is searched for.

However, in the conventional data search processing using feature values as a search key, there are the following problems.

It is difficult to convert human recognition into a numerical form together with a human personal point of view. Whatever feature values are used for specifying intended data, there are no feature values perfectly matched with a human sense. Therefore, it is difficult to determine optimum feature values for specifying intended data. Under such a circumstance, some feature values may be given as a search key by trial and error, whereby a data search is conducted for a trial. In this case, inappropriate data may also be included in search results. On the contrary, in the case where a search is conducted using text information as a search key, it is easy to find whether or not data contains elements having the text information as a keyword, and it is relatively easy to understand search results.

Furthermore, in the case where text information is used as a search key when a data search is continued to be conducted by trial and error, it is also relatively easy to assume text information given as a subsequent search key, based on the used text information and search results thereof. However, according to the method using feature values as a search key, it is difficult to determine appropriate feature values for specifying intended data in a subsequent search, as described above. It is difficult to empirically determine which feature values should be given for conducting a search by trial and error.

SUMMARY OF THE INVENTION

Therefore, with the foregoing in mind, it is an object of the present invention to provide a data search system that displays the grounds for extraction of data (search results) so that a user can easily understand them, allows a user to generally grasp the contents of search processing, and makes it easy to select feature values to be given in a subsequent search in data search processing using feature values as a search key; a data search method; and a processing program for realizing the data search system.

In order to achieve the above-mentioned object, a data search system of the present invention includes: a data retrieving part for retrieving data; a classifying and arranging part for classifying and arranging data in the data retrieving part on a display screen in accordance with feature values; a ground information providing part for providing each data with ground information visualizing grounds for classification and arrangement of the data by the classifying and arranging part; and a display part for displaying each data together with corresponding ground information in accordance with classification and arrangement information from the classifying and arranging part.

Because of the above-mentioned configuration, each data classified and arranged as search results is displayed together with ground information on classification and arrangement. A user can easily grasp the feature values of the data and the contents of data search processing merely by seeing the ground information. Furthermore, as a result of the data search processing, a user can easily grasp the reason why the data is disposed at that position.

In the above-mentioned configuration, it is preferable that the data search system utilizes a search key for a subsequent search, ground information displayed on the display part or a part of the ground information, or information obtained by altering a part of the ground information, and conducts subsequent search processing.

Because of the above-mentioned configuration, when a subsequent search is conducted, based on the data search results, information displayed as ground information (e.g., particular color information in color histogram information, a particular frequency component, information obtained by altering a part of the ground information, and the like) can be used as a data search key in a subsequent data search.

In the above-mentioned configuration, it is preferable that the classifying and arranging part conducts self-organization mapping processing in classification and arrangement processing of data so that data having similar feature values are disposed close to each other.

Because of the above-mentioned configuration, as a results of a data search, data with similar feature values used for a data search is disposed close to each other, list organization of search results is improved, and the contents of search results can be easily grasped.

In the above-mentioned configuration, it is preferable that the ground information is label information representing information on feature values used in the classification and arrangement and distribution information on the feature values of the data.

Because of the above-mentioned configuration, each data classified and arranged as search results is displayed together with label information. A user can easily grasp the feature values of the data and the contents of data search processing merely by seeing the label information. Furthermore, as a result of the data search processing, a user can easily grasp the reason why the data is disposed at that position.

If the data is image data, the information on feature values of the label information is color information, and distribution information on the feature values is color histogram information, as a results of an image data search, information regarding the color of selected image data can be obtained, and the contents of image data search processing is allowed to be easily grasped, and an element ratio of a color histogram is adjusted, whereby a clue to feature values used for a subsequent search can be obtained.

If the data is image data, the information on feature values of the label information is information on wavelet conversion feature values, and distribution information on the feature values is distribution information on frequency components, as a result of an image data search, information on frequency components of an image of selected image data can be obtained, the contents of image data search processing is allowed to be easily grasped, and a particular frequency component amount is paid attention to, whereby a clue to feature values used for a subsequent search can be obtained.

If the data is image data, information on the feature values of the label information is edge information in image data, and distribution information on the feature values is histogram information including a direction of an edge portion in the image data as an element, information can be displayed, representing which direction of 8 directions (vertical, horizontal, and diagonal directions) edges contained in image data are directed most.

If the data is image data, the information on feature values of the label information is color information, and distribution information on the feature values is representative color information, a user will know general color information contained in image data, and can conduct image data search processing using the color of image data as a due.

If a processing program code including processing for realizing the data search system of the present invention is provided, a data search system of the present invention can be configured by using a computer.

These and other advantages of the present invention will become apparent to those skilled in the art upon reading and understanding the following detailed description with reference to the accompanying figures.

DESCRIPTION OF THE PREFERRED EMBODIMENTS

The data search system of the present invention will be described with reference to the drawings. In the following embodiments, although image data is illustrated as an example of data, data is not limited to image data. Any data from which feature values can be extracted, such as voice data and text data, may be used.

Embodiment 1

A data search system of Embodiment 1 retrieves data, classifies and arranges the data on a display screen in accordance with feature values thereof, and provides each data with ground information representing the grounds for classification and arrangement of the data, thereby displaying classification and arrangement results of the data.

Figure 1:
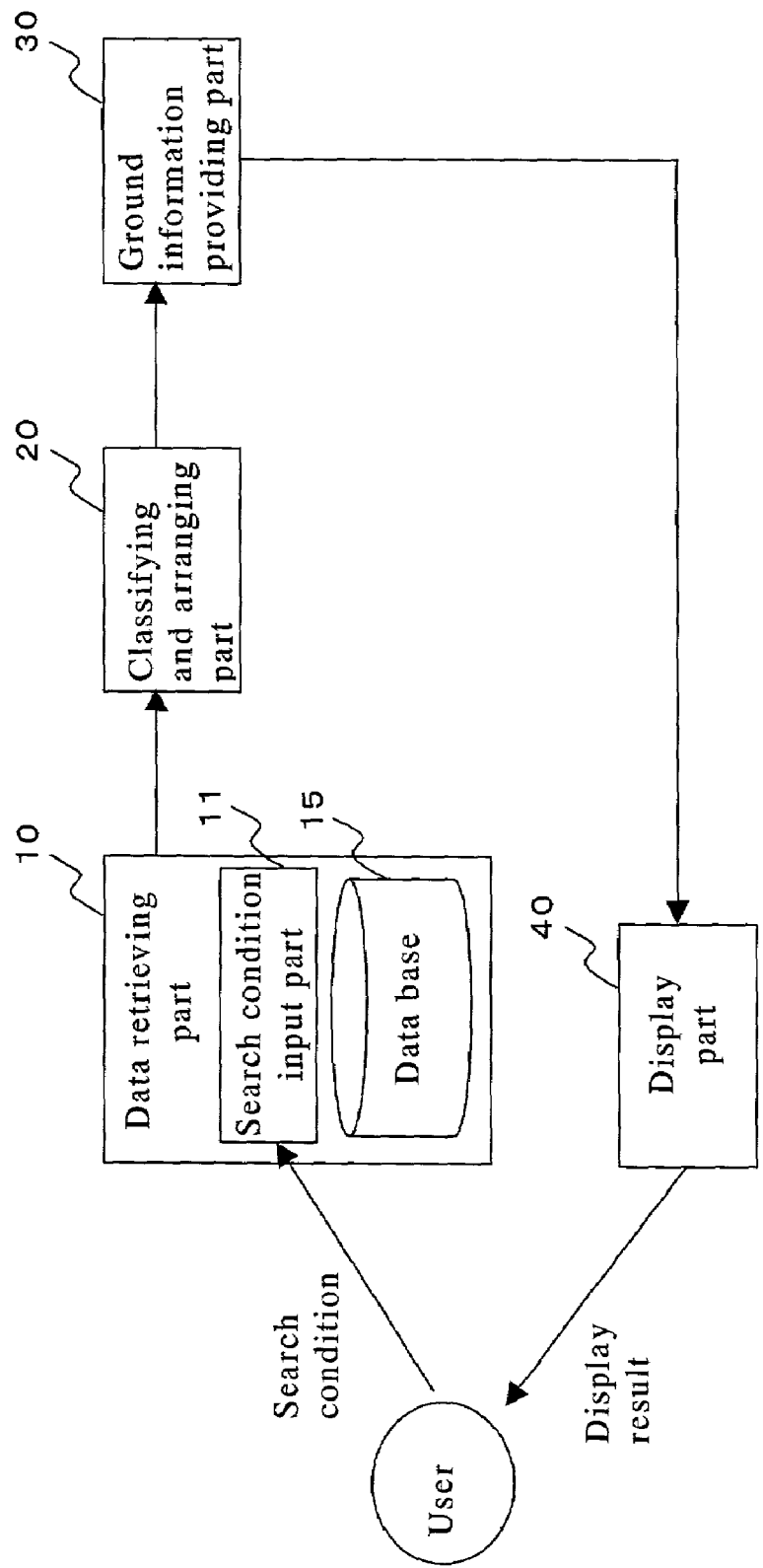
FIG. 1 shows a schematic configuration of a data search system of Embodiment 1 according to the present invention.

FIG. 1 shows a schematic configuration of the data search system of the present invention.

Reference numeral 10 denotes a data retrieving part. The data retrieving part 10 may previously retrieve and store data to be classified and arranged. Alternatively, the data retrieving part 10 may have the data search processing ability to search a database for data in accordance with search conditions and stores the searched data. Herein, the latter type will be described. The data retrieving part 10 has the data search processing ability to access a database 15, and searches and retrieves data under search conditions in accordance with a predetermined search algorithm. The database 15 may be provided in the data search system of the present invention, or may be an external database (e.g., an external database connected through the Internet). FIG. 1 shows an example in which the database 15 is provided in the data search system. In the case where an external database is utilized, the data retrieving part 10 may show search conditions and request a data search engine that manages the external database to search for data and receive searched data.

The search conditions may be input by a user through a search condition input part 11. As the search conditions, feature values may be given as a search key, and furthermore, text information may be used together as a search key.

Reference numeral 20 denotes a classifying and arranging part. The classifying and arranging part 20 classifies and arranges the data retrieved by the data retrieving part 10 on a display screen in accordance with the feature values of the data. In the data search system of the present invention, various algorithms for classification and arrangement used by the classifying and arranging part 20 can be applied. As an example, a self-organization mapping algorithm can be used.

A self-organization mapping technique is one of classification techniques adopting neuro-technology, which uses a local interaction to conduct self-organization by learning. If this procedure is applied to classification and arrangement of data, data seemed to have similar feature values that are paid attention to can be arranged close to each other in a mapping space. The data with similar feature values that are paid attention to is arranged close to each other, whereby a user of the data search system can easily grasp the whole data arrangement and easily understand the state of classification and arrangement of data.

Reference numeral 30 denotes a ground information providing part. The ground information providing part 30 provides each data with ground information visualizing the grounds for classification and arrangement of the data at a predetermined position.

The ground information is preferably information visualizing the grounds for classification and arrangement of the data with respect to a user of the data search system. An example of the ground information is label information representing the information on feature values used for classification and arrangement and the distribution information on feature values of data. Furthermore, various label information can be considered.

Figure 2:
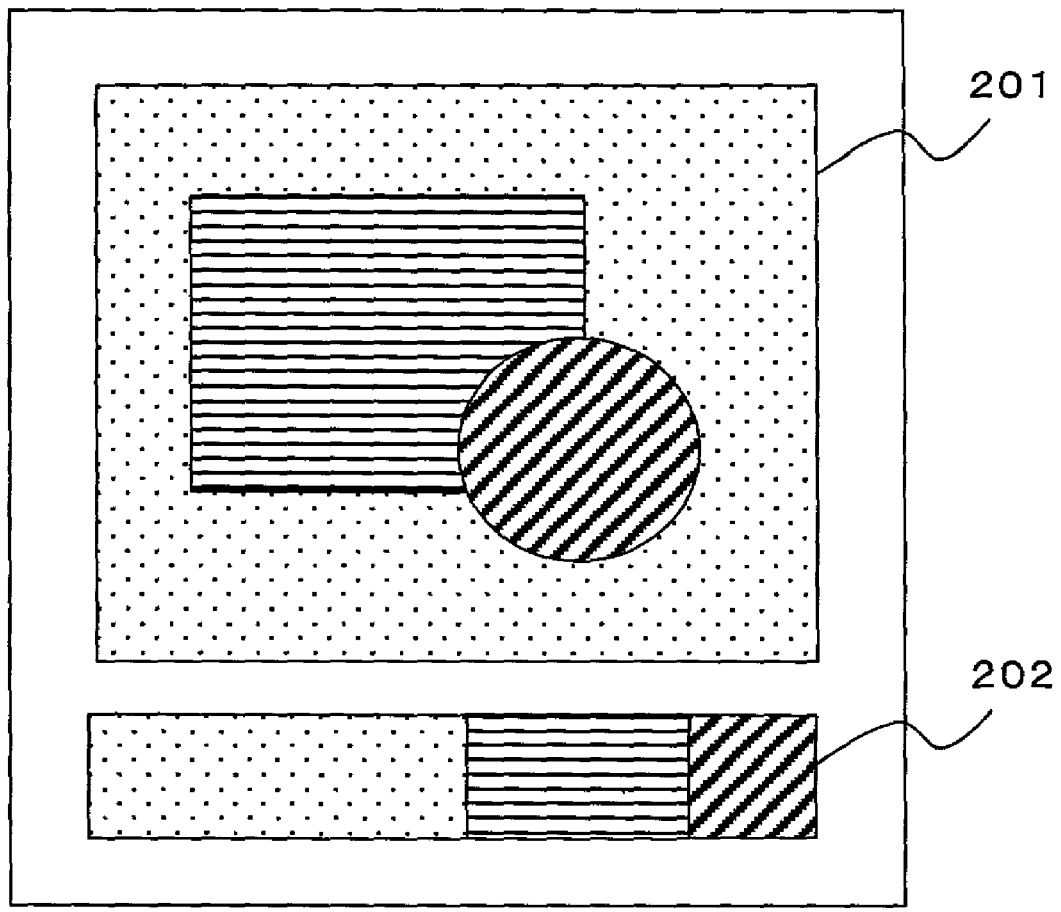
FIG. 2 shows an example where label information, in which information on feature values is color information and distribution information on feature values is color histogram information, is attached to image data as ground information.

An example of label information includes the case where data is image data, information on feature values is color information, and distribution information on feature values is color histogram information. FIG. 2 shows an example where data is image data, and label information, in which information on feature values is color information, and distribution information on feature values is color histogram information, is attached to image data as ground information. As shown in FIG. 2, color histogram label information 202 is attached to image data 201 like a caption. In this example, the image data 201 simply has three color regions, and has a color histogram with a ratio as shown in FIG. 2. Thus, by providing each image data with the color histogram label information 202, a user of the image data search system can easily grasp the influence of the color information in the image data on search results of image data and classification and arrangement results of image data.

Figure 3:
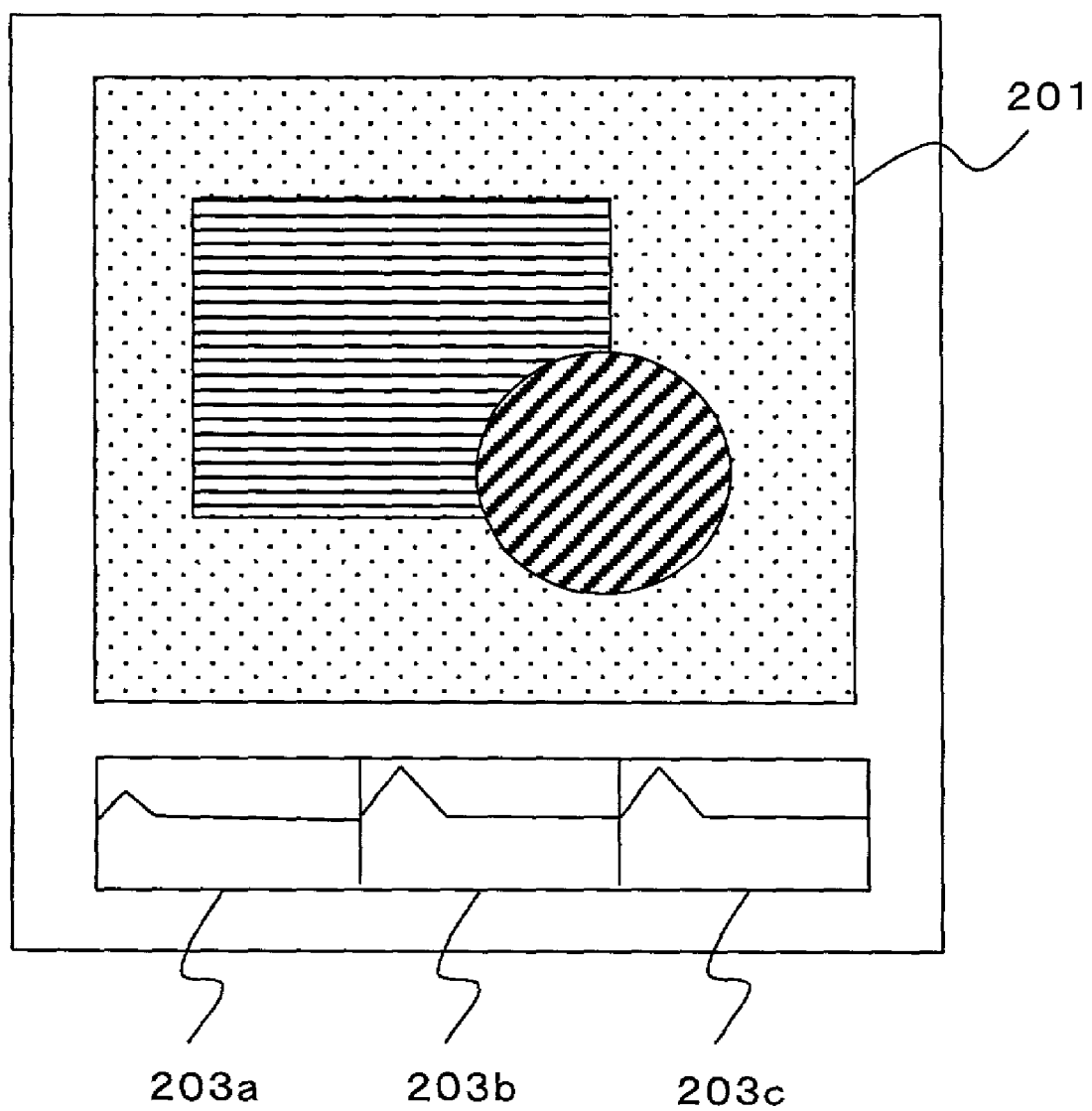
FIG. 3 shows an example where label information, in which information on feature values is information on wavelet conversion feature values, and distribution information on feature values is distribution information on frequency components, is attached to image data as ground information.

Another example of label information includes the case where data is image data, information on feature values is information on wavelet conversion feature values, and distribution information on feature values is distribution information on frequency components. If the wavelet conversion is used, frequency components can be extracted from image data in vertical, horizontal, and diagonal directions. FIG. 3 shows an example where label information, in which information on feature values is information on wavelet conversion feature values, and distribution information on feature values is distribution information on frequency components, is attached to image data as ground information. As shown in FIG. 3, the label information 203 on wavelet conversion feature values is attached to the image data 201 like a caption.

The label information 203 on wavelet conversion feature values shown in FIG. 3 is divided into three parts. These three parts are frequency distribution information 203$a$ in a vertical direction, frequency distribution information 203$b$ in a horizontal direction, and frequency distribution information 203$c$ in a diagonal direction, respectively. In these three frequency distribution information 203$a$ to 203$c$, the horizontal axis represents a frequency, the left side represents a low-frequency component, and the right side represents a high-frequency component. In the case of converting a frequency by wavelet conversion, positional information can be held together with frequency component information. Therefore, information can be obtained, which represents where and how much a low-frequency component is present. Thus, by attaching the label information 203 on wavelet conversion feature values to each image data, a user of the data search system can easily grasp the influence of frequency components in the vertical, horizontal, and diagonal directions in image data (i.e., information such as the shape and fineness of a change in the vertical, horizontal, and diagonal directions in an image portion) on search results of image data and classification and arrangement results of image data.

Another example of label information is representative color label information in which data is image data, information on feature values is color information, and distribution information on feature values is representative color information. The representative color may be only one color, or a plurality of colors such as two colors and three colors. A color histogram of the representative color(s) may be used as label information. In the case where the representative color is only one color, the distribution information on feature values becomes only one color. In the case where there are a plurality of representative colors, the distribution information on feature values represent a ratio of the plurality of colors. Herein, the representative color refers to a color representing image data. The ground information providing part 30 can adopt various algorithms for determining a representative color. For example, in the case where the size of a color region can be extracted, the color in the largest region can be determined as a representative color.

Furthermore, in the case where a color region in image data is in a dither status or the like, an algorithm can be adopted which calculates a color aggregation degree in image data and the like, and finds the lump of color regions. Furthermore, the representative color selected by the ground information providing part 30 can be manually confirmed, and a representative color can be reselected. Thus, by providing image data with the representative color label information, a user of the data search system will know the tendency of general color information contained in image data, and can conduct search processing of image data using the color of the image data as a clue.

Another example of label information includes the case where data is image data, information on feature values is edge information in image data, and distribution information on feature values is histogram information containing a direction of an edge portion as an element. Because of the edge histogram label information, information can be displayed, representing a direction among 8 directions (vertical, horizontal, and diagonal directions) in which edges contained in image data are directed most.

Reference numeral 40 denotes a display part. The display part 40 displays each data together with corresponding ground information in accordance with classification and arrangement information obtained from the classifying and arranging part 20.

In the schematic configuration of the data search system in FIG. 1, a communication interface and other devices are not shown for convenience.

Next, a processing flow of a data search using the data search system of the present invention will be shown. The following description will be made illustrating image data.

Figure 4:
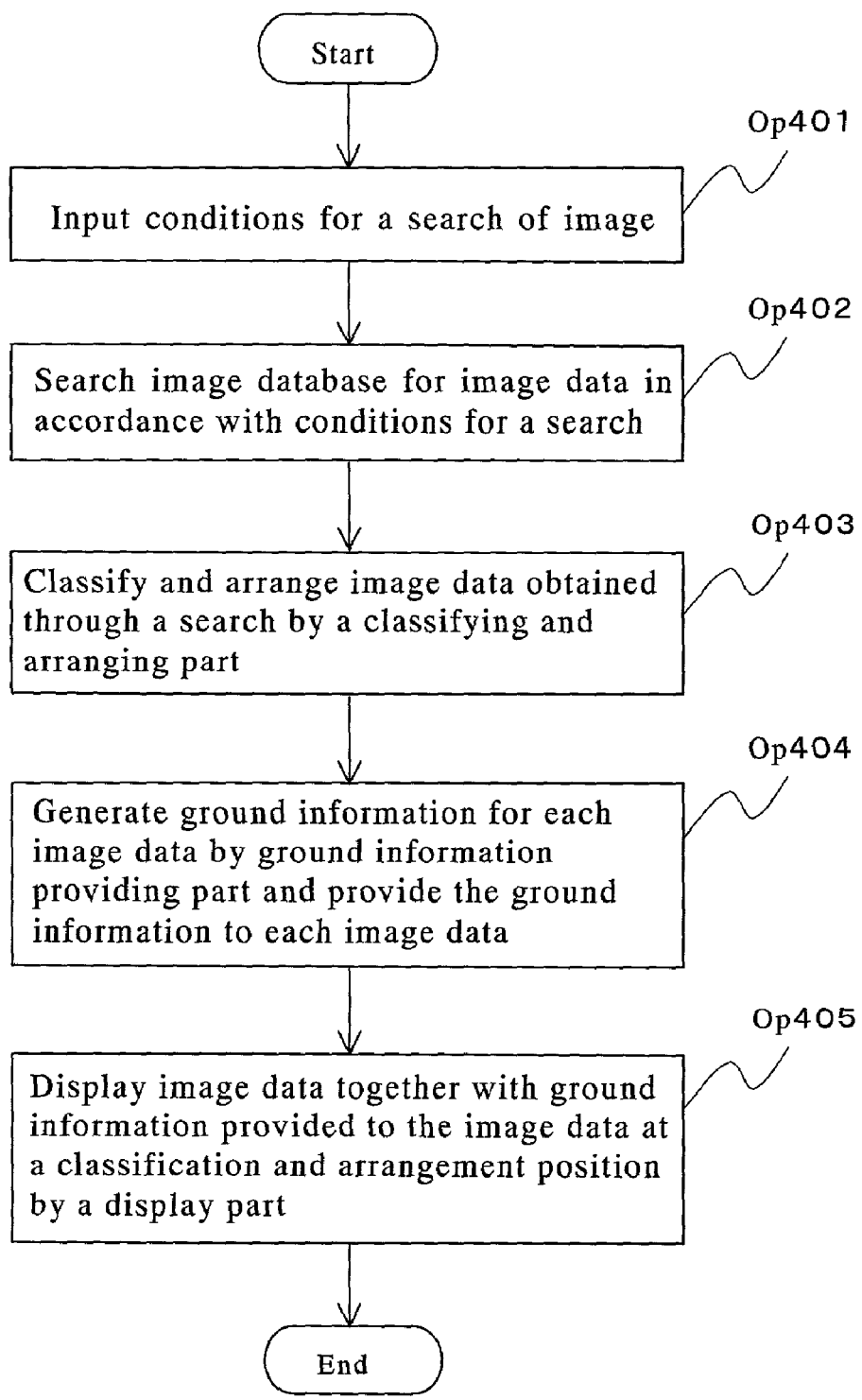
FIG. 4 is a flow chart showing an exemplary flow of data search processing using the data search system of the present invention.

FIG. 4 is a flow chart showing an exemplary flow of data search processing using the data search system of the present invention.

In the following example, the data retrieving part 10 has the data search processing ability, and data search processing is conducted for retrieving data. In the case where the data to be classified and arranged is previously retrieved by the data retrieving part 10, such processing is not required.

First, as pre-processing, distribution information on predetermined feature values is extracted from image data to be stored in the database 15. The distribution information thus extracted is used for data search processing and classification and arrangement processing described later. Examples of the distribution information include color histogram information, information on wavelet conversion feature values, representative color information, and edge histogram information.

A user inputs search conditions for image data to the data retrieving part 10 through the search condition input part 11 (Operation 401). As the search conditions, there may be various conditions such as a keyword representing the contents of features of a desired image, the kinds of feature values which a user desires to use, and parameters thereof. Herein, for example, color information is specified as the kind of feature values which a user desires to use, and a "blue color" is given as a parameter.

Next, the data retrieving part 10 searches the database 15 for image data under the input search conditions (Operation 402). The data retrieving part 10 gives the image data obtained as the search results to the classifying and arranging part 20.

The classifying and arranging part 20 classifies and arranges the image data given by the data retrieving part 10 (Operation 403). The image data can be classified and arranged two-dimensionally or three-dimensionally as well as one-dimensionally, using a self-organization map or the like. The features of classification and arrangement at Operation 403 can also be used as feature values for classification and arrangement of feature values, parameters, and the like used as the search conditions at Operation 401. Furthermore, feature values separate from the feature values and parameters used as the search conditions at Operation 401 can also be used. In the former case, the classifying and arranging part 20 receives feature values and parameters used as the search conditions input through the search condition input part 11 of the data retrieving part 10, and uses them as feature values for classification and arrangement. In the latter case, at Operation 403, a user specifies the feature values for classification and arrangement, or feature values for classification and arrangement are previously determined.

Next, the ground information providing part 30 generates ground information based on the feature values used for search processing and classification and arrangement processing for each image data, and provides image data with the ground information thus generated (Operation 404). For example, in the case where color information is used as feature values, color histogram label information is generated and provided to each image data.

Figure 5:
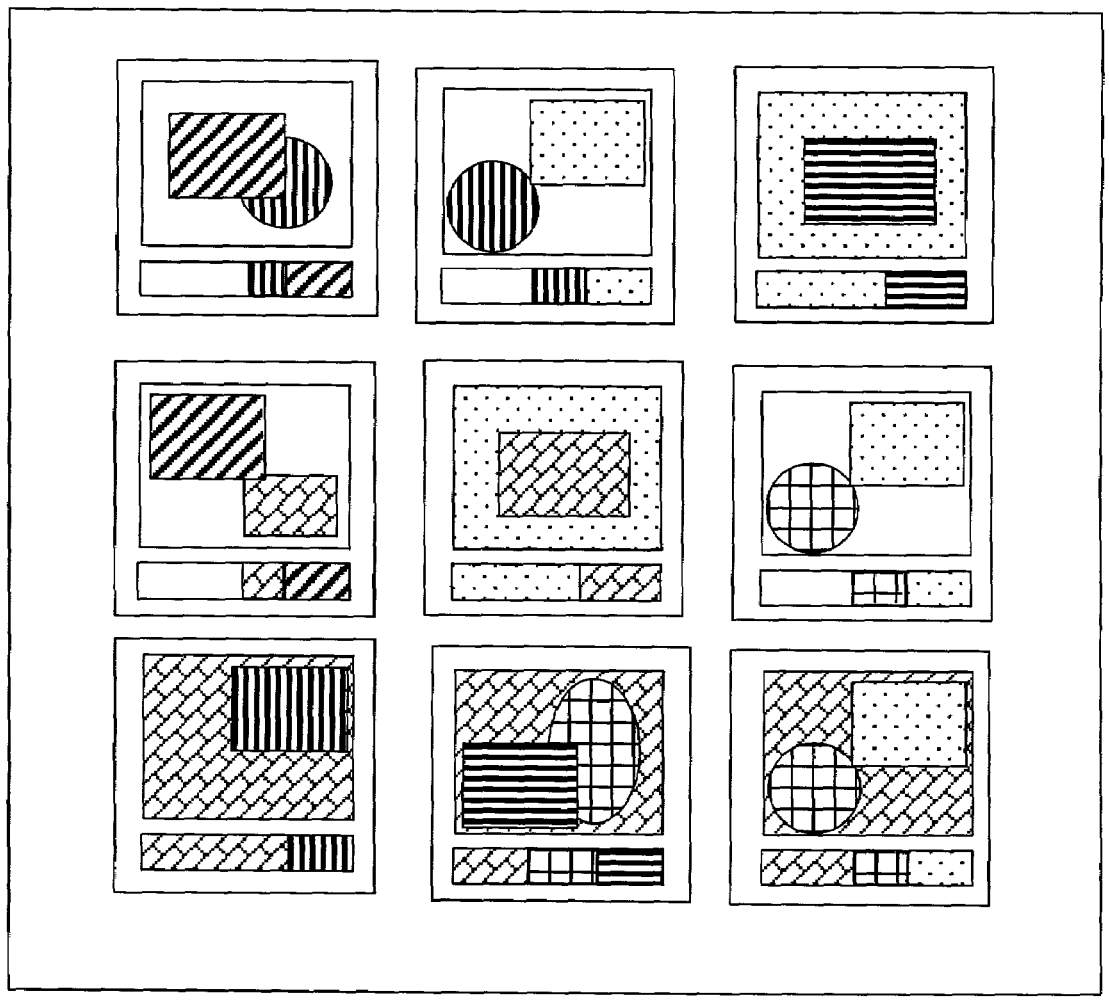
FIG. 5 shows an exemplary display of image data classified and arranged by the data search system of the present invention.

Next, the display part 40 combines the image data with the ground information provided to the image data, and arranges them in a classification and arrangement position FIG. 5 shows a display example of image data classified and arranged. This example is a classification and arrangement example in the case where color histogram label information is provided to image data as ground information. FIG. 5 shows schematic views of 9 image data. As shown in FIG. 5, the lower side of each image data is provided with label information representing color histogram information. A user of the data search system can generally grasp the influence of a ratio of the respective color regions in search results and classification and arrangement results of each image data by referring to the label information.

Figure 6:
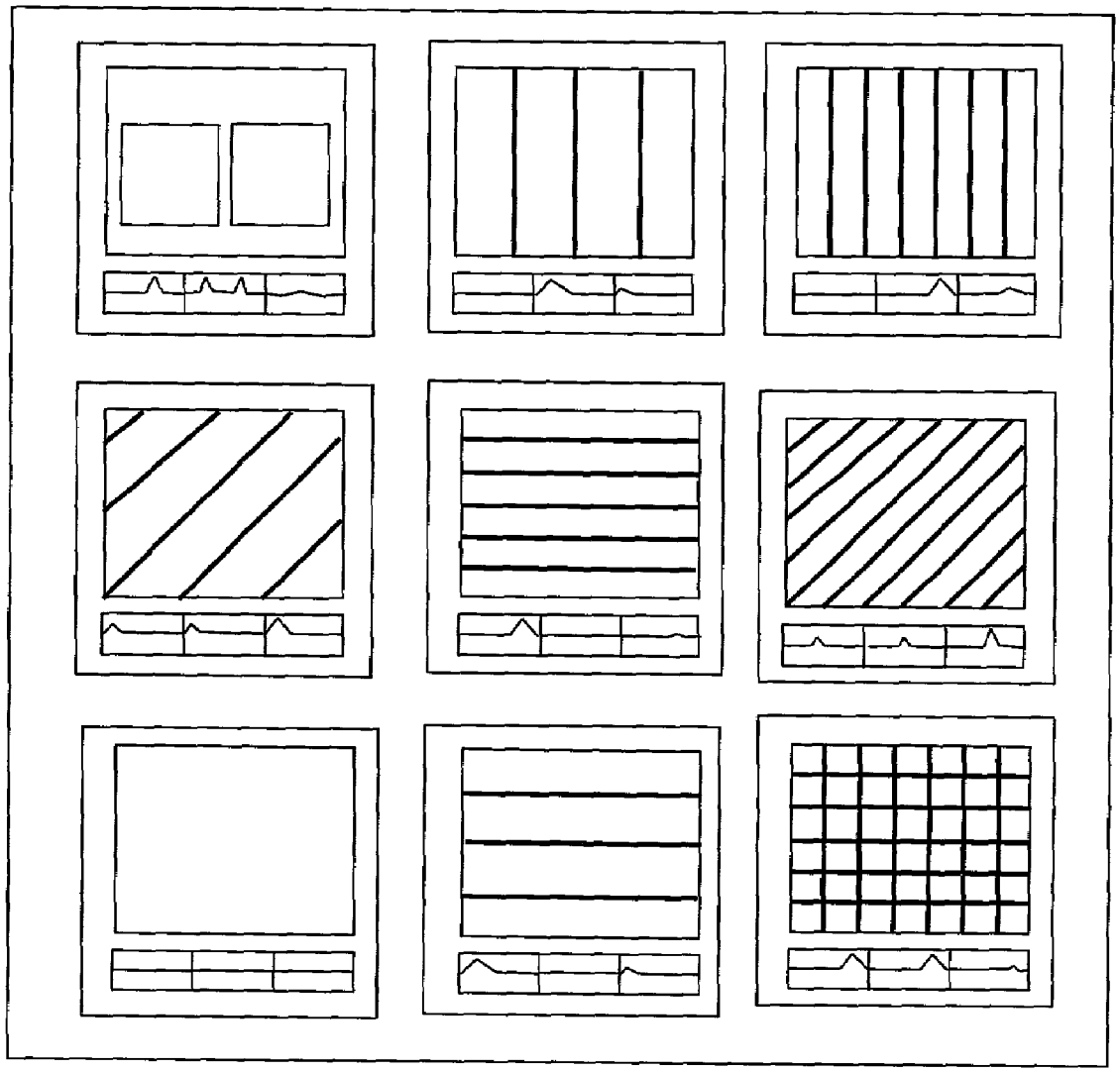
FIG. 6 shows another exemplary display of image data classified and arranged by the data search system of the present invention.

FIG. 6 shows another display example of image data classified and arranged. This example is a classification and arrangement example in the case where label information on wavelet conversion feature values representing distribution information on wavelet conversion frequency components is given to image data as ground information. FIG. 6 shows schematic views of 9 image data. As shown in FIG. 6, the lower side of each image data is provided with label information on wavelet conversion feature values. Among three parts of the label information on wavelet conversion feature values, the left side represents a frequency component distribution in the vertical direction, the middle side represents a frequency component distribution in the horizontal direction, and the right side represents a frequency component distribution in the diagonal direction. A user of the data search system can generally grasp the influence of the frequency component distribution in each direction in search results and classification and arrangement results of each image data by referring to the label information.

As described above, the data search system of Embodiment 1 can display each image data classified and arranged as search results together with ground information on classification and arrangement. A user can easily grasp the feature values of image data, the contents of image data search processing, and the standard by which the image data is disposed at that position, merely by referring to ground information such as color histogram label information, wavelet conversion feature value label information, typical color label information, and edge histogram label information.

Embodiment 2

A data search system of Embodiment 2 is obtained by further improving the data search system of Embodiment 1. More specifically, the data search system of Embodiment 2 includes a technique of conducting a subsequent search of data displayed in a display part. In this technique, the data search system receives ground information or a part thereof displayed in the display part, or information obtained by altering a part of ground information as information for a subsequent search, and conducts subsequent search processing.

Even in Embodiment 2, the data retrieving part 10 has the data search processing ability to conduct a data search and retrieve data from the database 15.

The schematic configuration of the data search system of Embodiment 2 may be similar to that of FIG. 1. However, processing in the search condition input part 11 is different. The search condition input part 11 in Embodiment 2 is capable of inputting conditions for a subsequent search as described later. The search condition input part 11 in Embodiment 2 is capable of simply and flexibly inputting conditions for a subsequent search, using ground information provided to data.

Figure 7:
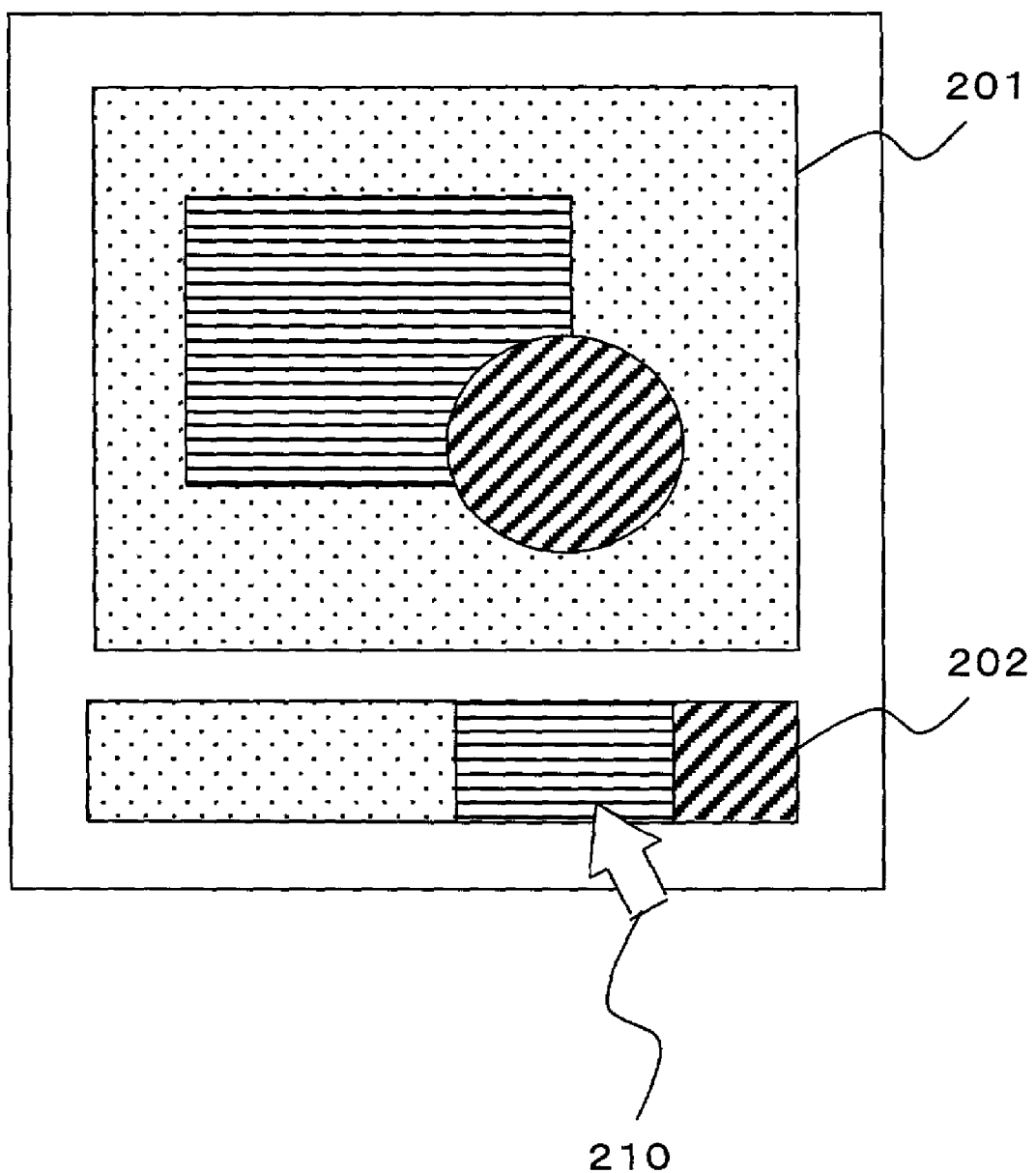
FIG. 7 shows an exemplary operation for input of conditions for a subsequent search using color histogram label information shown in FIG. 2.

For example, FIG. 7 shows a state of input of conditions for a subsequent search, using the color histogram label information shown in FIG. 2, wherein image data is used in the same way as in Embodiment 1. As shown in FIG. 7, when a color element of color histogram label information of image data on a display screen is clicked on by a cursor 210 of a pointing device such as a mouse, the search condition input part 11 recognizes that the color information is specified to be a parameter as conditions for a subsequent search. Simultaneously, input of a processing part for a subsequent search is also made possible.

When a processing part of a "reexecution search" is specified, and color information is given as conditions for a reexecution search, the data retrieving part 10 accesses the database 15 again, using the color information as a search key, and conducts a reexecution search of image data. For example, if color information of "blue" is classified and arranged as a search key in the previous search, and color information of "red" is given as a search key in a "reexecution search", image data having "red" as a representative color is searched for and retrieved from the database 15 again, and classified and arranged by the classifying and arranging part 20.

If a processing part of "screening of a search" is specified, and color information is given as conditions for a screening search, a search for the image data retrieved in the data retrieving part 10 is further screened, using the color information as a search key. For example, if color information of "blue" is classified and arranged as a search key in the previous search, and color information of "red" is given as a search key in "screening of a search", among the image data classified and arranged, image data containing a large amount of color information of "blue" and "red" is screened.

If "reclassification and rearrangement" is specified, and color information is given as the conditions for a subsequent search, reclassification and rearrangement are conducted again, using the color information as a parameter, based on the image data currently retrieved. As a processing method of reclassification and rearrangement, a number of methods can be assumed. According to the first processing method, information other than the information specified for reclassification and rearrangement is ignored, and the classification and arrangement is conducted again. For example, when classification and arrangement are conducted based on color information of "blue" in the previous classification and arrangement, and reclassification and rearrangement are conducted based on color information of "red", using the first processing method, image data used for reclassification and rearrangement is the same as that in the previous classification and arrangement. However, in reclassification and rearrangement, color information of "blue" is ignored, and new classification and arrangement are conducted based on color information of "red". According to the second processing method, results of classification and arrangement in the previous classification and arrangement are taken over, and classification and arrangement are conducted by adding information specified for reclassification and rearrangement. For example, when classification and arrangement are conducted based on color information of "blue" in the previous classification and arrangement, and reclassification and rearrangement are conducted based on color information of "red" using the second processing method, image data used for reclassification and rearrangement is the same as that in the previous classification and arrangement, and classification and arrangement are conducted based on color information of "red", using the classification and arrangement results based on color information of "blue" in the previous classification and arrangement. In this case, the classification and arrangement results based on color information of "blue" are not so changed as a whole, and among them, image data having a large amount of color information of "red" is classified and arranged in a group.

Figure 8:
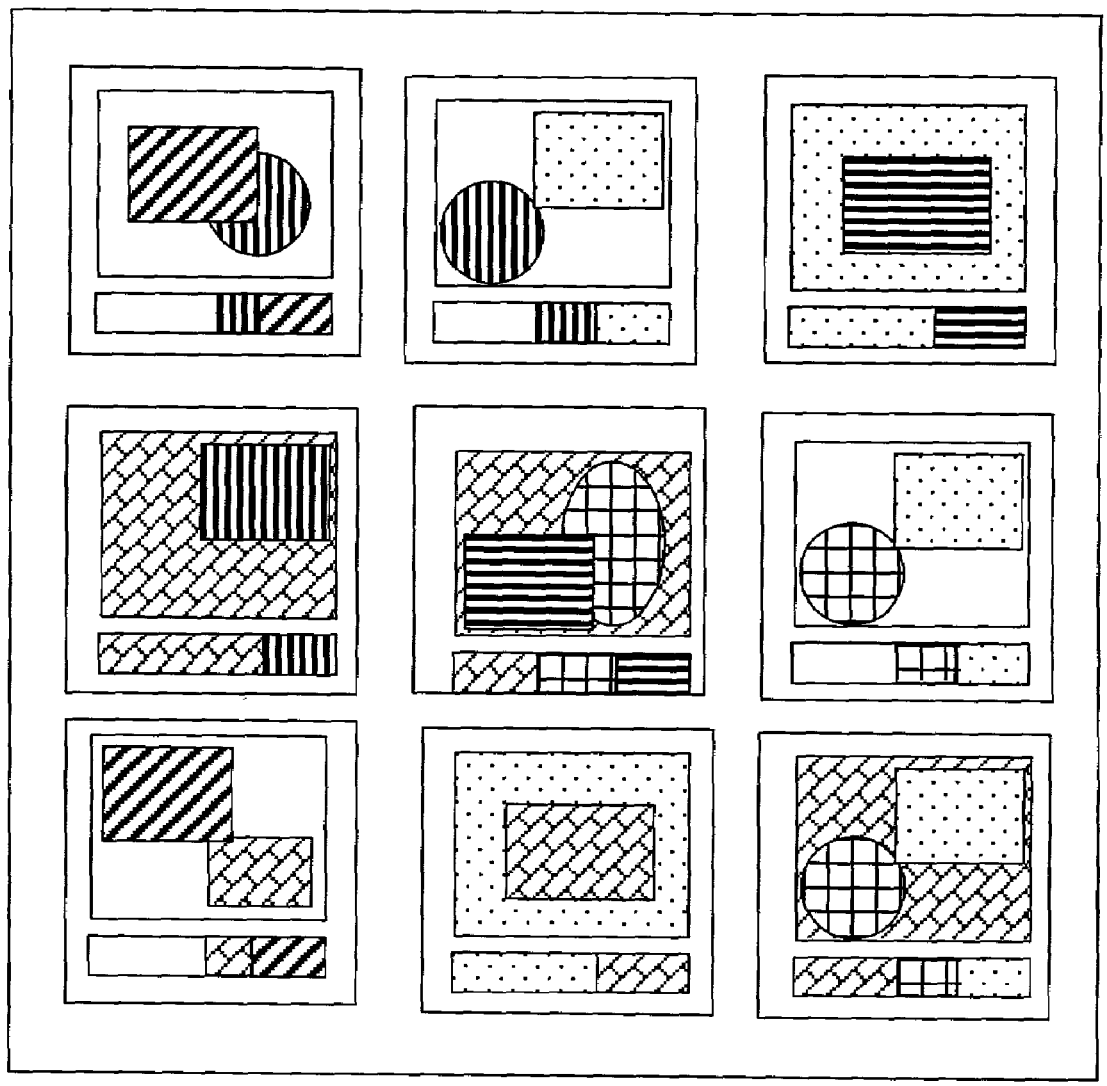
FIG. 8 shows an exemplary display where the image data shown in FIG. 5 is reclassified and rearranged.

If required, it may be possible that a particular image is specified and a position is fixed on a classification and arrangement screen in the previous classification and arrangement so that the particular image is disposed at the same position after reclassification and rearrangement. It may also be possible that a particular image is specified and a position is fixed on a classification and arrangement screen in the previous classification and arrangement so that the particular image is disposed at the center after reclassification and rearrangement An example of reclassification and rearrangement will be shown in the figure. For example, it is assumed that search processing is conducted under certain search conditions, and image data having the color histogram label information in FIG. 5 is displayed as classification and arrangement results. Herein, it is also assumed that a user checks the classification and arrangement results in FIG. 5, and desires to conduct reclassification and rearrangement, paying attention to red color (in FIGS. 5 and 8, red regions are presented by vertical hatching) among the image data. When a red element in color histogram label information is clicked on by the cursor 210 of a pointing device such as a mouse, and "reclassification and rearrangement" are specified by the first method for reclassification and rearrangement processing, the image data shown in FIG. 5 is reclassified and rearranged as shown in FIG. 8.

Figure 9:
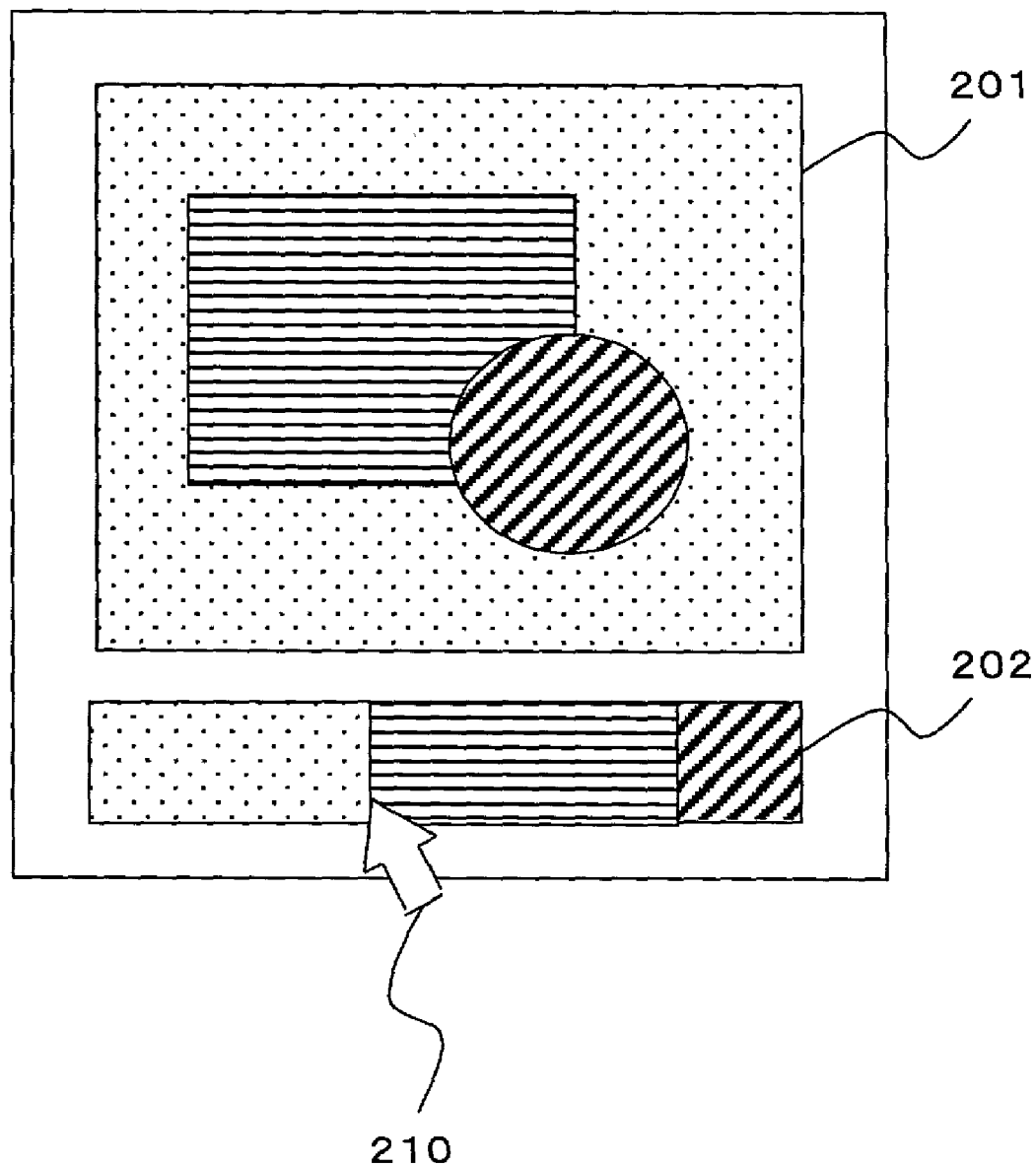
FIG. 9 shows an exemplary operation where a border line between color elements of the color histogram label information shown in FIG. 2 is dragged to alter color histogram information, and the color histogram information thus obtained is specified as conditions for a subsequent search.

As shown in FIG. 9, it may also be possible that a border line between color elements of color histogram label information of image data on a display screen is dragged to alter the color histogram information, and the color histogram information thus altered is specified as conditions for a subsequent search. In this case, image data having color histogram information specified under the conditions for a subsequent search, and a predetermined number of image data highly matched with the color histogram information are searched for.

Figure 10:
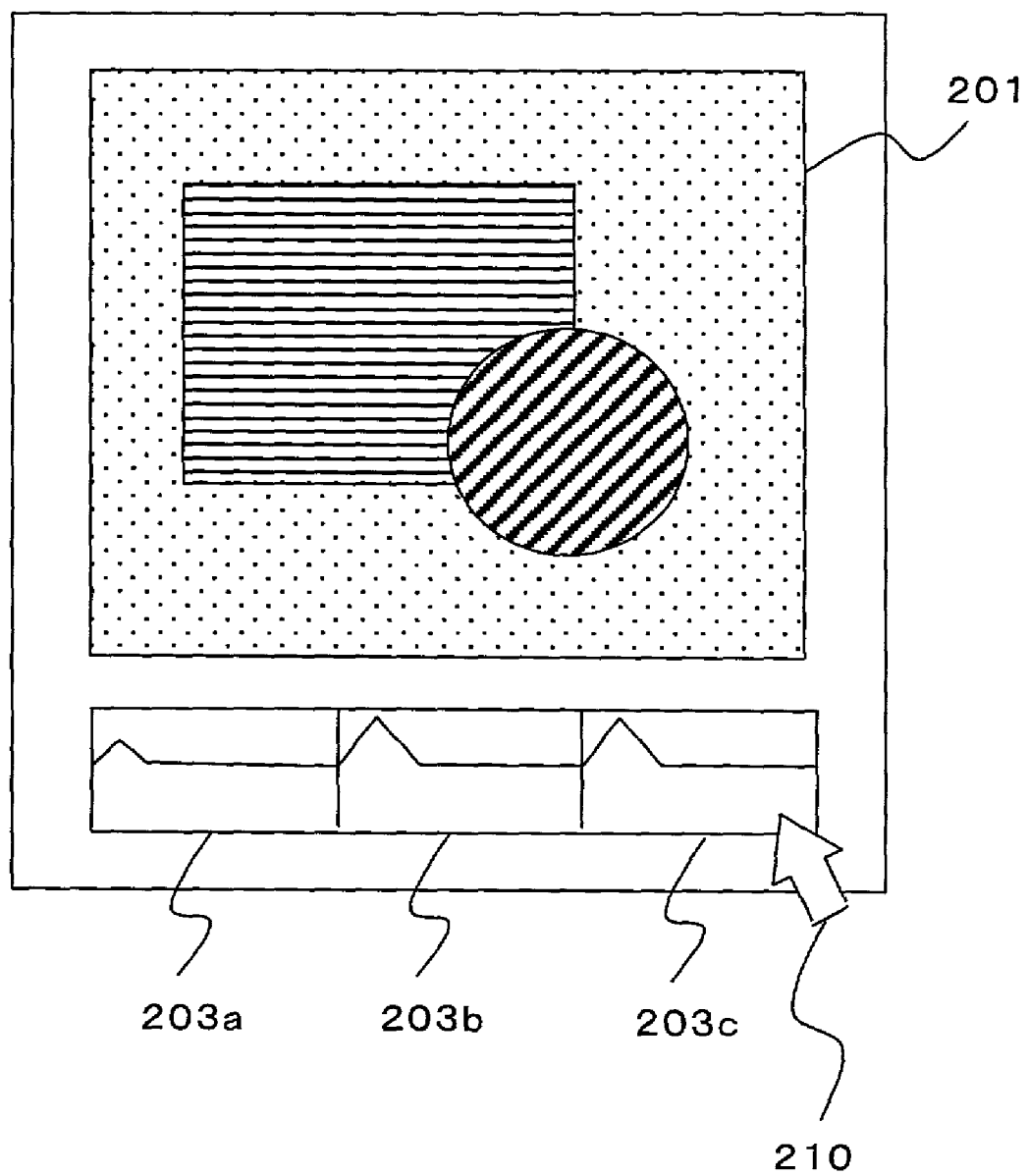
FIG. 10 shows an exemplary operation for input of conditions for a subsequent search using the label information on wavelet conversion feature values shown in FIG. 3.
Figure 11:
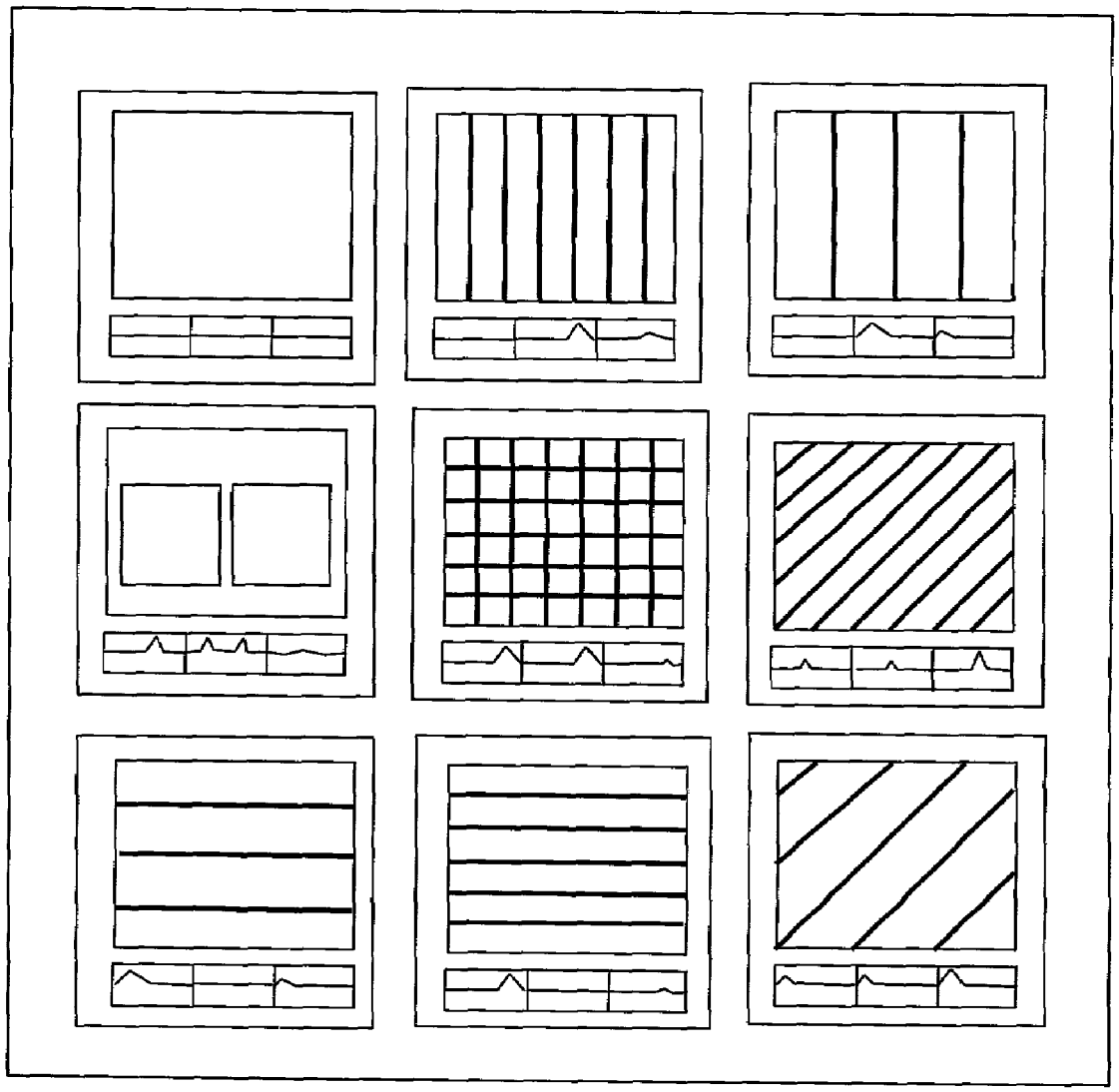
FIG. 11 shows an exemplary display where the image data shown in FIG. 6 is reclassified and rearranged.

Another example is shown. FIG. 10 shows an exemplary operation for input of conditions for a subsequent search, using the label information on the wavelet conversion feature values shown in FIG. 3. As shown in FIG. 10, when a frequency component distribution in a certain direction of the label information on the wavelet conversion feature values of image data on a display screen is clicked on by the cursor 210 of a pointing device such as a mouse, the search condition input part 11 recognizes that the frequency component distribution regarding the direction is specified to be a parameter as the conditions for a subsequent search. Simultaneously, input of a processing part for a subsequent search is also possible, and the processing part of a "reexecution search", the processing part of "screening of a search", and the processing part for "reclassification and rearrangement" can be specified. Now, it is assumed that search processing is conducted under certain conditions for a search, and classification and rearrangement results are displayed. For example, it is assumed that image data having label information on the wavelet conversion feature values in FIG. 6 is displayed. For example, it is assumed that a user checks the classification and arrangement results in FIG. 6, and desires to conduct reclassification and rearrangement, paying attention to a frequency component in the vertical direction. Herein, when a frequency component in the vertical direction in the label information on wavelet conversion feature values is clicked on by the cursor 210 of a pointing device such as a mouse, and "reclassification and rearrangement" is specified, the image data shown in FIG. 6 is reclassified and rearranged as shown in FIG. 11.

Figure 12:
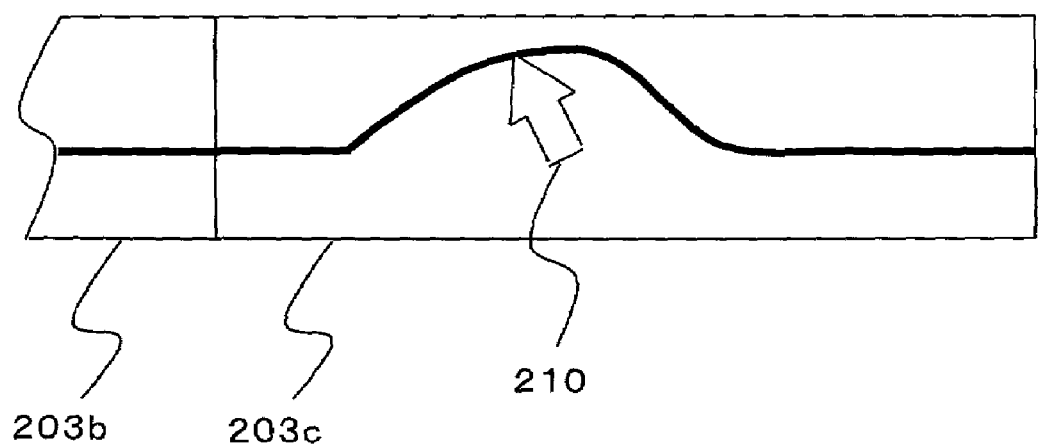
FIG. 12 shows an exemplary operation where an envelope of frequency components of the label information on wavelet conversion feature values shown in FIG. 3 is deformed by dragging, and the information thus obtained is specified as conditions for a subsequent search.

Furthermore, the following may also be possible: as shown in FIG. 12, an envelope of frequency components of the label information on wavelet conversion feature values of image data on a display screen is deformed by dragging, whereby the label information on wavelet conversion feature values is altered, and specified as the conditions for a subsequent search. In this case, image data having a wavelet conversion frequency component specified under the conditions for a subsequent search, and a predetermined number of image data highly matched with the wavelet conversion frequency component are searched for.

Thus, a user can grasp the contents of the current search processing and classification and arrangement processing from ground information by checking display results of image data, and appropriately and flexibly specify the conditions for a subsequent search by using the label information.

Embodiment 3

Figure 13:
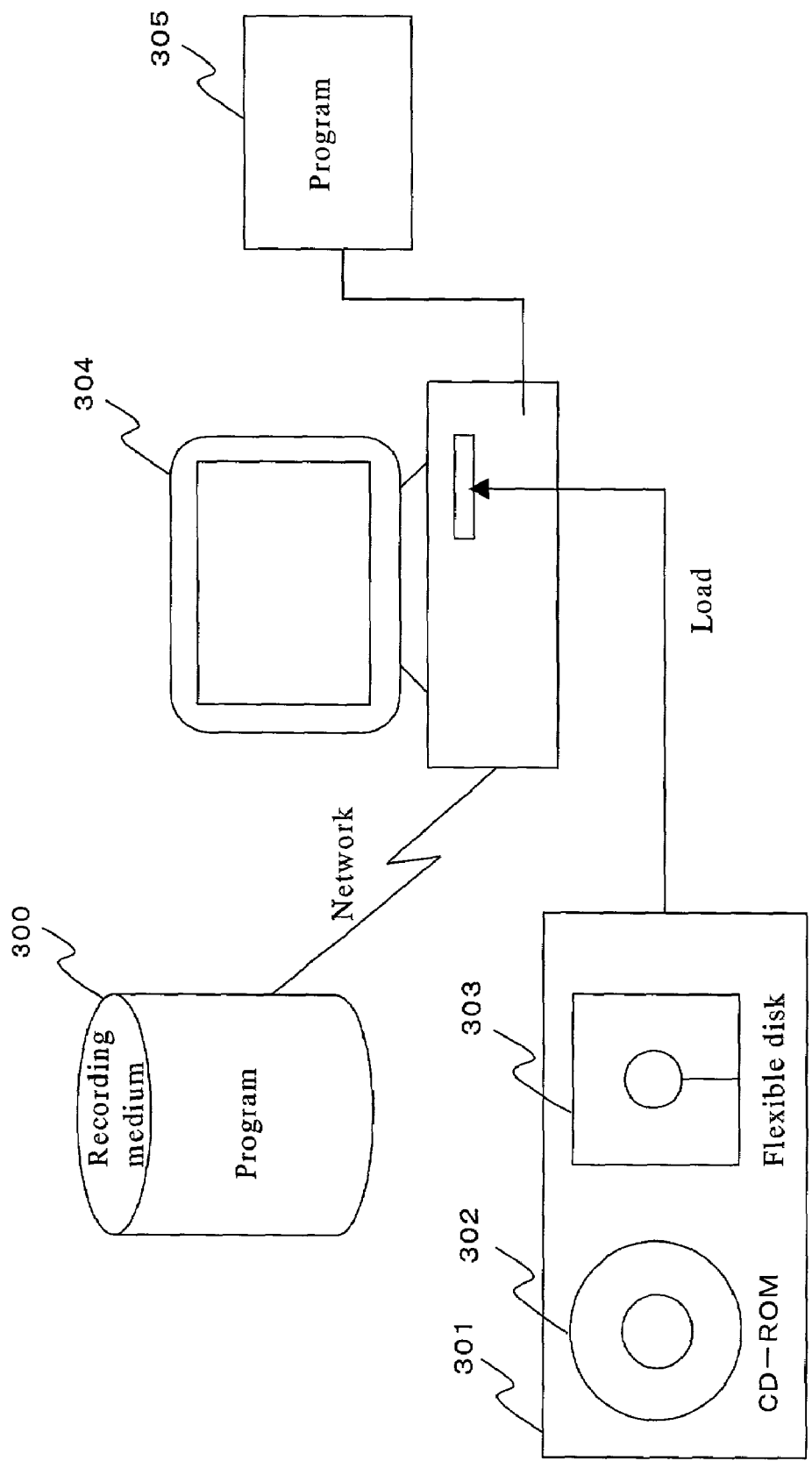
FIG. 13 shows an exemplary configuration where a processing program for realizing the data search system of the present invention is loaded onto a computer.

The data search system of the present invention can be configured using various kinds of computers by providing a program describing processes of realizing the above-mentioned configuration. According to a method for loading a program including processes of realizing the data search system of the present invention onto a computer, a recording medium storing the program may be read by a computer, or the program may be downloaded from the network. For example, as shown in FIG. 13, a portable recording medium 301 such as a CD-ROM 302 and a flexible disk 303 can be read by a computer 304, or the program can be downloaded from the recording medium 300 in a recording apparatus on the network. Furthermore, the program may be stored in a recording medium 305 such as a hard disk and a RAM in the computer 304. The program for realizing the data search system is loaded onto the computer 304, and executed on a main memory during execution.

It is understood that various modifications and alterations may be made to the above-mentioned method and apparatus without departing from the idea of the present invention. Thus, care should be taken so that the present invention is not limited to the above-mentioned embodiments.

According to the data search system of the present invention, ground information on classification and arrangement is displayed together with each data classified and arranged as search results. Thus, a user can easily grasp the feature values of data and the contents of data search processing merely by checking the ground information. Furthermore, a user can easily grasp the results of data search processing and the reason why the data is disposed at that position.

Furthermore, in the data search system of the present invention, a subsequent search can be conducted utilizing particular elements of feature values included in the results of the previous data search (e.g., particular color information, a particular frequency component, etc.) directly as a data search key in a subsequent data search. Furthermore, ground information or a part of ground information which a user desires to use for a subsequent data search may be specified, or a part of ground information may be altered and used as a search key for a subsequent data search. Thus, conditions for a subsequent search can be set appropriately and flexibly.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A data search system, comprising:
   a data retrieving part retrieving data;
   a classifying and arranging part classifying and arranging the data in the data retrieving part on a display screen in accordance with feature values, said feature values defining particular traits of the data, and conducting processing in the classification and the arrangement of the data so that the data having similar feature values are disposed close to each other;
   a ground information providing part providing each data with ground information visualizing grounds of the classification and the arrangement of the data; and
   a display part displaying each data together with corresponding ground information in accordance with the classification and the arrangement of the data, wherein the data retrieving part receives the ground information displayed on the display part or a part of the ground information, or information obtained by altering a part of the ground information, and conducts a subsequent search processing by use of the received information as a search key.

2. The data search system according to claim 1, wherein the classifying and arranging part conducts self-organization mapping processing in the classification and the arrangement of the data so that data having similar feature values are disposed close to each other.

3. The data search system according to claim 1, wherein the ground information is label information representing information on feature values used in the classification and the arrangement and distribution information on the feature values of the data.

4. The data search system according to claim 3, wherein the data is image data, and in the label information, the information on the feature values is color information, and the distribution information on the feature values is color histogram information.

5. The data search system according to claim 3, wherein the data is image data, and in the label information, information on the feature values is edge information in image data, and the distribution information on the feature values is histogram information including a direction of an edge portion in the image data as an element.

6. The data search system according to claim 3, wherein the data is image data, and in the label information, the information on feature values is color information, and the distribution information on the feature values is representative of color information.

7. The data search system according to claim 1, wherein the display part displays the ground information corresponding to each data in a caption state so that the ground information accompanies each data.

8. A data search system, comprising:
   a data retrieving part retrieving date;
   a classifying and arranging part classifying and arranging the data in the data retrieving part on a display screen in accordance with feature values, said feature values defining particular traits of the data, a ground information providing part providing each data with ground information visualizing grounds of the classification and the arrangement of the data; and a display part displaying each data together with corresponding ground information in accordance with the classification and the arrangement of the data, wherein
the ground information is label information representing information on feature values used in the classification and the arrangement and distribution information on the feature values of the data, and the data is image data, and in the label information, the information on feature values is information on wavelet conversion feature values, and the distribution information on the feature values is distribution information on frequency components of the image data subjected to wavelet conversion.

9. A data search method, comprising:

retrieving data;

classifying and arranging the data at a position on a display screen in accordance with feature values, said feature values defining particular traits of the data, and conducting processing in the classification and the arrangement of the data so that the data having similar feature values are disposed close to each other;

providing each data with ground information visualizing grounds for classification and arrangement at the position on the display screen;

displaying each data together with corresponding ground information at a classification and arrangement position;

receiving the ground information displayed or a part of the ground information, or information obtained by altering a part of the ground information; and conducting a subsequent search processing by use of the received information as a search key.

10. The data search method according to claim 9, wherein, in the display operation, the ground information corresponding to each data is displayed in a caption state so that the ground information accompanies each data.

11. A computer program for realizing a data search system, comprising:

data retrieving processing to retrieve date;

classifying and arranging processing to classify and arrange the data obtained from the data retrieving processing at a position on a display screen in accordance with feature values, said feature values defining particular traits of the data, and conducting processing in the classification and the arrangement of the data so that the data having similar feature values are disposed close to each other;

ground information providing processing of each data with ground information visualizing grounds of the classification and the arrangement at the position;

display processing to display each data together with corresponding ground information at a classification and arrangement position;

receiving the ground information displayed or a part of the ground information, or information obtained by altering a part of the ground information; and conducting a subsequent search processing by use of the received information as a search key.

12. The computer program according to claim 11, wherein, in the display processing, the ground information corresponding to each data is displayed in a caption state so that the ground information accompanies each data.

* * * * *

UNITED STATES PATENT AND TRADEMARK OFFICE
CERTIFICATE OF CORRECTION

| | | |
|---|---|---|
| PATENT NO. | : 7,158,987 B2 | Page 1 of 1 |
| APPLICATION NO. | : 09/994769 | |
| DATED | : January 2, 2007 | |
| INVENTOR(S) | : Susumu Endo et al. | |

It is certified that error appears in the above-identified patent and that said Letters Patent is hereby corrected as shown below:

Column 12, Line 65, change "date;" to --data;--.

Column 13, Line 2, change "data," to --data;--.

Column 14, Line 9, change "date;" to --data;--.

Signed and Sealed this

Eighth Day of May, 2007

JON W. DUDAS
*Director of the United States Patent and Trademark Office*